Jan. 24, 1967   D. W. CARLSON ETAL   3,299,475
METERING APPARATUS FOR AN INJECTION MOLDING MACHINE
Filed Oct. 24, 1963   2 Sheets-Sheet 1

INVENTORS
DONALD W. CARLSON
JOHN M. COX
BY C. R. Meland
THEIR ATTORNEY

INVENTORS
DONALD W. CARLSON
JOHN M. COX
BY C. R. Meland
THEIR ATTORNEY

United States Patent Office 3,299,475
Patented Jan. 24, 1967

3,299,475
METERING APPARATUS FOR AN INJECTION MOLDING MACHINE
Donald W. Carlson, Anderson, and John M. Cox, Indianapolis, Ind., assignors to General Motors Corporation, Detroit, Mich., a corporation of Delaware
Filed Oct. 24, 1963, Ser. No. 318,660
3 Claims. (Cl. 18—30)

This invention relates to molding apparatus of molding and more particularly to a high pressure molding machine having a plurality of pistons for moving the molding material sequentially from a hopper into a die cavity.

In the molding of materials into a die cavity under high pressure, a problem of excess material, that is, material that is consumed in a casting process but does not go into the finished part, exists. This excess material usually takes the form of gates and runners and causes the necessity for a costly trimming operation to separate this excess material from the cast part.

Another problem normally associated with the casting of materials under pressure into a closed die cavity is that of constant density of the part cast. The lack of density of a cast part manifests itself either in a surface blemish or in a structural defect beneath the surface of a cast article. There are many methods and devices used in the prior art, for example, overflow pads and air vents, which attempt to overcome these problems; but in any given application, these methods and devices produce other problems.

It is an object of the present invention to provide an apparatus for injecting materials into a die that will result in casting material being consumed only in the formation of the part cast.

It is another object of the present invention to provide an apparatus for metering a mass of casting material and transferring this metered mass in its entirety to completely fill a die cavity.

It is still a further object of the present invention to provide apparatus that will transform a granular material into a molten material as this material is being metered.

It is yet a further object of the present invention to provide apparatus that combines several casting processes, such as, compression, transfer and injection, into a unitary device.

Further objects and advantages of the present invention will be apparent from the following description, reference being had to the accompanying drawings wherein a preferred embodiment of the present invention is clearly shown.

Figure 1:
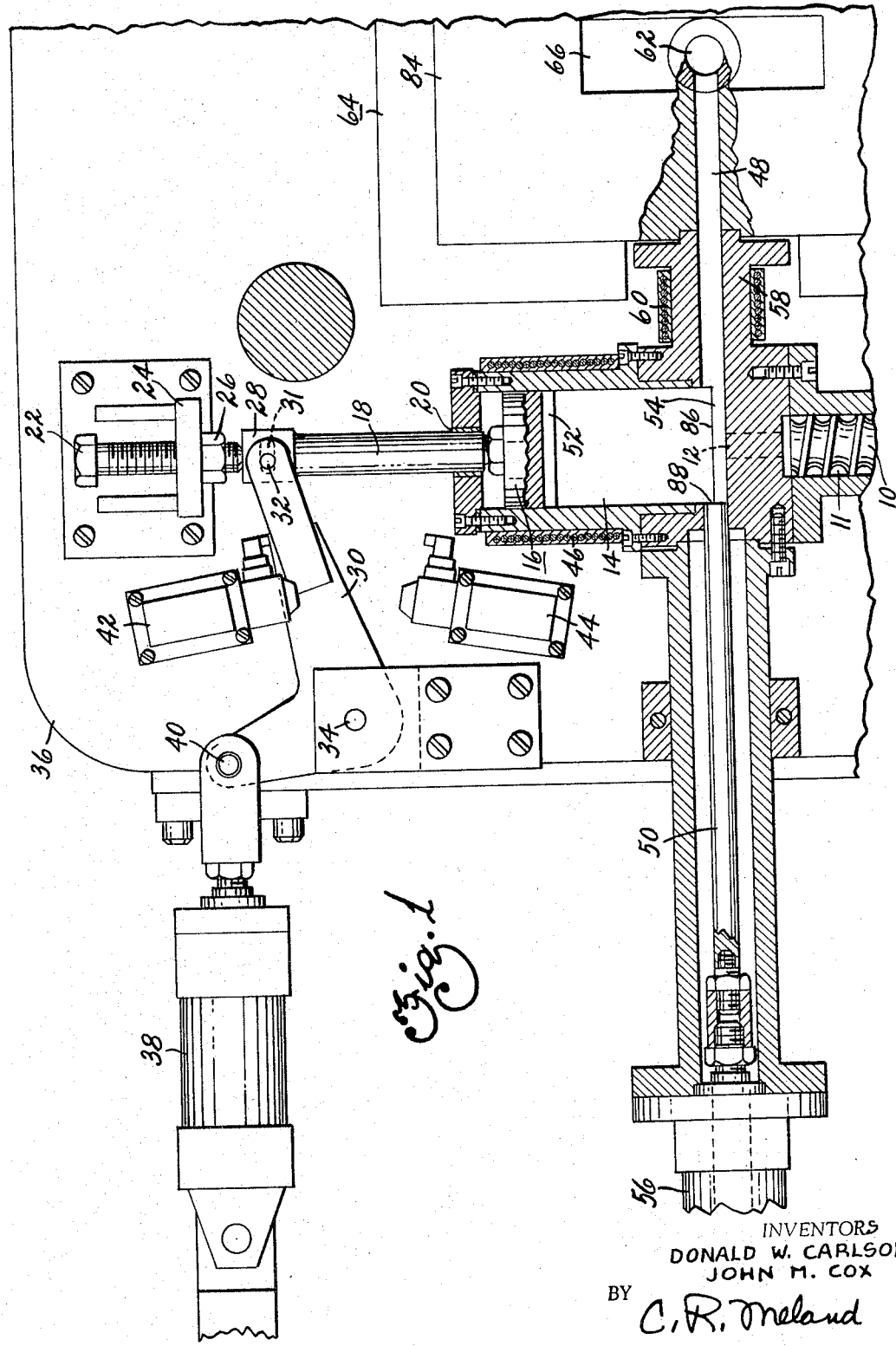
FIGURE 1 is a partial sectional view of the invention setting out the relationship between the feed mechanism, the metering mechanism, and the transfer mechanism and includes a typical hydraulic and electrical system for use therewith.

Referring now to FIGURE 1, an extruding screw 10 operating within chamber 11 draws casting material from a hopper, not shown, and moves it through sprues 12 into a metering chamber 14. A metering piston 16 is caused to move away from the sprue area as the material is forced into the metering chamber. A link rod 18 is connected to one end of the metering piston 16 in any wellknown manner and is disposed to slide through and be guided by an aperture 20 in one wall of the metering chamber. The amount of travel of the link rod 18 is limited by an adjusting screw 22 passing through a fixed stop block 24. The screw 22 is held in any desired position by a nut 26. The link rod 18 has a flat portion 28 pivotally engaging a drive link 30 by means of a pivot pin 32. A slot 31 in the link 18 allows the drive link 30 to move freely around the pivot pin 32. The drive link 30 is supported on a pivot pin 34 carried by a fixed portion of the casting machine 36. A power cylinder 38 actuates the link 30 through a drive pin 40. Limit switches 42 and 44 are arranged to energize circuits to the power cylinder in response to forward and backward extremes of movement of the drive link. An electric heater 46 is circumferentially mounted around the metering chamber 14 to maintain the molding material in the molten state.

A transfer chamber 48 communicates with the metering chamber 14 and the impact chamber 62. A transfer piston 50 operated by a power cylinder 56 is disposed for slidable movement through the metering chamber 14 and through the full length of the transfer chamber 48. The inner end of the piston 16 and the one end wall of the chamber 14 are provided with complementary arcuate grooves 52 and 54 respectively which are just large enough to provide clearance for the piston 50. A heater 60 surrounds an exposed portion 58 of the transfer chamber 48.

Figure 2:
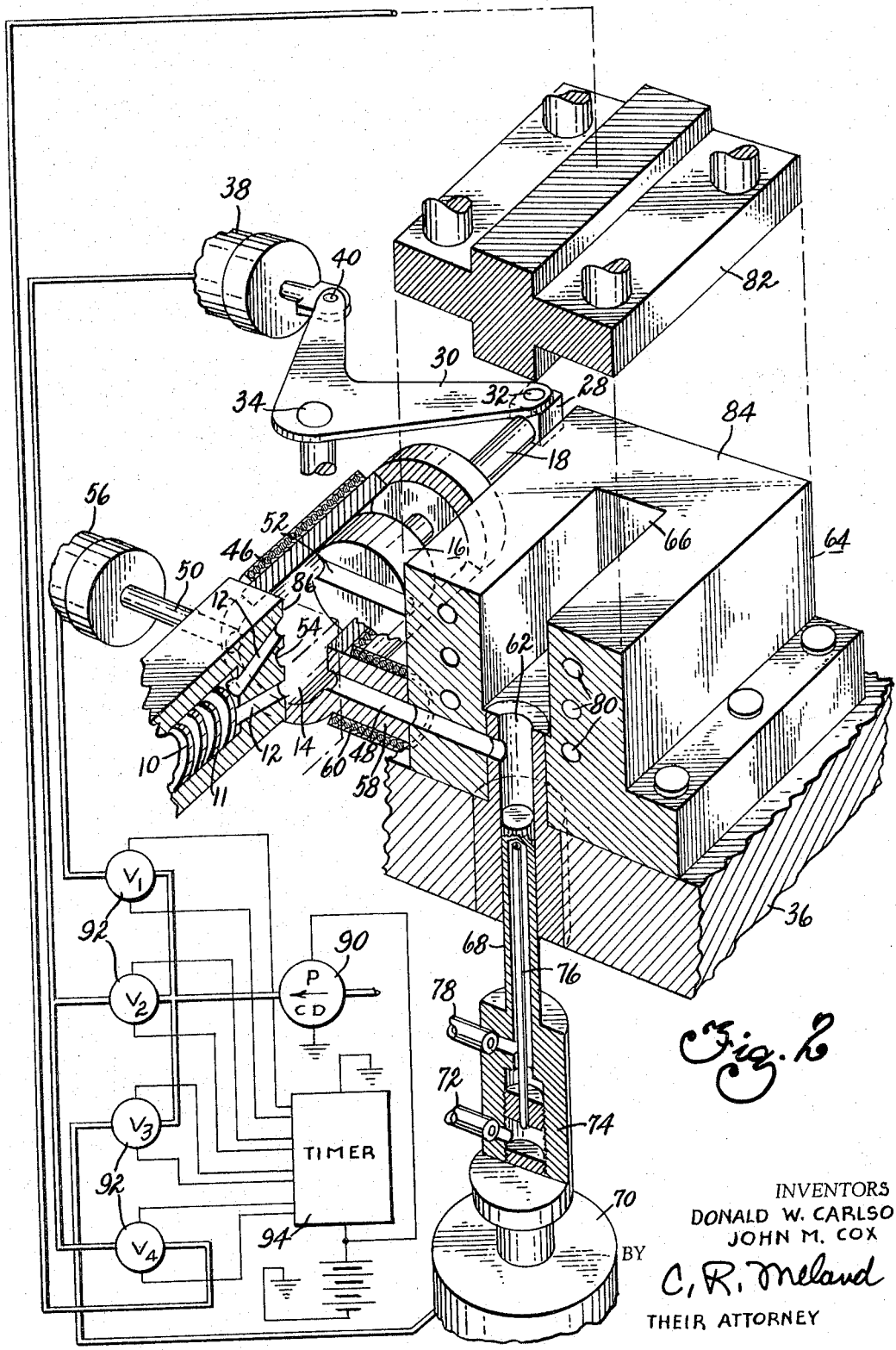
FIGURE 2 is a partial perspective view of the invention with parts broken away illustrating the special relationship of the various material moving means and the die cavity.

As clearly seen in FIGURE 2, the impact chamber 62 is located in a die block 64 directly beneath a die cavity 66 and is closed on one end by an impact piston 68. The impact piston 68 is driven by a power cylinder 70 in any well-known fashion. In a typical installation, a cooling line 72 passing into a portion 74 of the piston causes a cooling fluid to flow in a tube or fountain 76 within the impact piston 68. An outlet line 78 disposes of the heated cooling fluid. Cooling lines 80 can be placed in the die block 64 in any well-known fashion. The impact chamber 62 is in direct fluid communication with the die cavity 66. A movable core 82 is disposed to be moved into engagement with a surface 84 of the die block 64 and forms a closure means for the die cavity 66.

In operation, referring to FIGURE 1, any common molding material, such as a thermoplastic material, is driven by an extruding screw 10 from a hopper, not shown, through the sprues 12 into the metering chamber 14. At this point in the cycle, the metering piston 16 is fully extended so that it abuts the end wall 86 of the metering chamber 14. Also, at this time in the cycle, the transfer piston 50 is fully extended so that the driving end is in a position substantially adjacent to the impact chamber 62. This positioning of the transfer piston allows it to operate as a valve thereby effectively preventing any of the molding material to enter the impact chamber prematurely. As the extruding screw 10 works the molding material into the extruding chamber 11 and forces molding material into the metering chamber 14, the molding material, being in granular form, is caused to be raised to its melting point by pressure against the walls of these chambers. This granular mass then becomes a molten mass and, as pressure is increased, further drives the metering piston 16 in the direction of the aperture 20 in one end wall of the metering chamber. Depending on the exact amount of material needed to fill the die cavity, the link rod 18 will travel in the direction of the stop block 24 and will be caused to stop against the adjusting screw 22, thus limiting its rearward movement. The limit switch 42 is disposed to make contact with the drive link 30 at the time the drive link, attached to link rod 18, reaches the limit of its travel. This energization of the limit switch 42 initiates a cycle through appropriate electrical apparatus, not shown, which first causes the transfer piston 50 to be withdrawn until the end that was in adjacent relationship to the impact chamber is at point 88 in the transfer chamber 48. As the transfer piston 50 is fully retracted, the powered cylinder 38 causes the metering piston 16 to extend into the metering chamber 14 and drive the molten molding material into the transfer chamber 48. The metering piston 16 will substantially empty the metering chamber 14 of the molding material except for an amount filling the arcuate slots 52 and 54. As the metering piston 16 abuts the end wall 86 of the metering chamber 14, a limit switch 44 is disposed to make contact with the drive link 30. This switch will actuate appropriate electrical circuitry, not shown, and will energize the powered cylinder 56 in the forward direction. The transfer piston 50 will thereby be driven in the direction of the impact chamber 62 purging the slots 52 and 54 and the transfer chamber 48 of any residue of molding material as it moves.

Referring now to FIGURE 2, it is seen that the impact chamber 62 constitutes substantially less volume than the metering chamber 14. Therefore, as the molded material is caused to flow through the transfer chamber 48, a portion of the material will drop into the impact chamber 62 while the remainder, which is the majority of the material, will be forced into the die cavity 66. It is evident that, because of the small amount reposing in the impact chamber 62, the molding material will substantially, but not quite, fill the die cavity 66. During this stage of the cycle, the movable core 82 is in a withdrawn position relative to the die cavity 66 leaving a portion of the die cavity open. Therefore, the incoming molten material, that is, the material that is forced into the die cavity directly from the metering chamber, drives most of the air from the die cavity and the movable core 82 is arranged to very quickly seat itself and close off the die cavity as the impact plunger drives the remainder of the casting material into the die cavity. The impact piston 68 moves through the impact chamber 62 under high pressure and reaches the end of its travel at a point substantially parallel to the bottom of the die cavity. It is thus seen that the end of the impact piston actually forms a portion of the wall of the cavity. Any method well-known in the casting art can be used to extract the part from the cavity.

Referring now to FIGURE 2, a typical hydraulic system for use with the subject device is illustrated. A constant drive pump 90 distributes hydraulic pressure selectively through a series of valves 92. The valves 92 are electrically controlled by a timer 94 through the use of limit switches such as those indicated by the numerals 42 and 44. These limit switches are well known in the art and are located at a convenient location near the moving portions of the power cylinders. The sequential operation of the cylinder is thus brought about in a conventional manner and does not constitute any part of the invention.

The sequence of operation described takes place very rapidly and a maximum cycling speed of the apparatus using this method would result in the best temperature gradients being established in the various chambers. Therefore, utility of this machine becomes apparent in that the solution of a problem, that is, the high production, automated manufacture of castings, contributes to the quality of the product produced. Another advantage of the present invention is that automated character of the apparatus allows the high production of cast products without the need of an operator.

Another advantage of the subject device is that there is no excess casting material to be removed from the finished casting. This feature is brought about by the movement of the impact plunger to a point where the driving end forms a portion of the wall of the casting. This advantage is made possible through the metering feature of the apparatus which allows only the exact volume of molten casting material to be injected into the molding apparatus.

It is immediately seen that the basic advantages of the compression, transfer and injection processes have been operatively combined into a unitary device to bring about mass production of gate-free molded articles.

It should be noted that the power cylinders herein described can be of a hydraulic or an air variety. The exact amount of density required in the finished product would dictate the exact pressure ranges in which the described apparatus should operate. Utilizing apparatus such as described with hydraulic power cylinders, it is possible to develop in excess of 35,000 p.s.i.

While the embodiment of the present invention, as herein disclosed, constitutes a preferred form, it is to be understood that other forms might be adopted.

What is claimed is as follows:

1. In a molding machine for the high pressure casting of thermoplastic materials, said machine having a metering apparatus arranged to selectively meter a predetermined amount of molding material, transfer means including an outlet chamber therefor, said chamber being in communicating relationship with said metering chamber, an impact means including a chamber in communication with said transfer chamber, and a die cavity having one portion formed by a movable core and another portion formed by said impact means, said die cavity being in fluid communication with said impact chamber, said metering apparatus comprising: a yieldable first piston slidable in a metering chamber and displaceable by molding material fed into said metering cavity; and a second piston forming a portion of said transfer means movable at right angles to said first piston in said metering chamber, and movable in an aperture formed in said yieldable first piston and said transfer means to displace all of the molding material remaining in said metering chamber after evacuation of the major portion of said metering chamber by a movement of said yieldable first piston towards said transfer means.

2. A metering apparatus according to claim 1 wherein said second piston is disposed through the metering chamber to isolate a portion of said transfer means from the input of the molding material during metering and later being withdrawn to move into the metering chamber after said yieldable first piston has advanced to an extreme of movement wherein the metering chamber is substantially evacuated.

3. A metering apparatus according to claim 1 wherein said yieldable first piston has an arcuate slot formed across a face thereof in complementary relationship to an arcuate slot of the same dimension formed in a wall of the metering chamber arranged to allow the passage of said second piston when said first piston engages said wall.

References Cited by the Examiner

UNITED STATES PATENTS

| | | | |
|---|---|---|---|
| 3,012,440 | 12/1961 | Rex et al. | 264—328 |
| 3,036,340 | 4/1962 | Waddell | 264—329 |
| 3,092,440 | 6/1963 | Rex | 264—328 |
| 3,137,038 | 6/1964 | Maynard | 18—30 |
| 3,146,282 | 8/1964 | Nenneman | 18—30 |
| 3,191,233 | 6/1965 | Linderoth | 18—30 |
| 3,191,234 | 6/1965 | Hendry | 18—30 |

FOREIGN PATENTS

| | | |
|---|---|---|
| 1,113,559 | 9/1961 | Germany. |
| 1,127,579 | 4/1962 | Germany. |
| 15,474/61 | 9/1962 | Japan. |
| 15,475/61 | 10/1962 | Japan. |

J. SPENCER OVERHOLSER, *Primary Examiner.*

ROBERT F. WHITE, *Examiner.*

R. B. MOFFITT, W. L. McBAY, *Assistant Examiners.*